US011048493B2

(12) United States Patent
Mine et al.

(10) Patent No.: US 11,048,493 B2
(45) Date of Patent: Jun. 29, 2021

(54) COMPUTER SYSTEM, METHOD OF UPDATING SOFTWARE WITH COMPUTER SYSTEM, AND PROGRAM THEREFOR

(71) Applicant: Hitachi, Ltd., Tokyo (JP)

(72) Inventors: Hiroshi Mine, Tokyo (JP); Soki Sakurai, Tokyo (JP); Noboru Kiyama, Tokyo (JP); Atsushi Katou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 180 days.

(21) Appl. No.: 15/667,778

(22) Filed: Aug. 3, 2017

(65) Prior Publication Data

US 2018/0095745 A1 Apr. 5, 2018

(30) Foreign Application Priority Data

Sep. 30, 2016 (JP) .............................. JP2016-194786

(51) Int. Cl.
 *G06F 8/65* (2018.01)
 *G06F 8/658* (2018.01)
 (Continued)

(52) U.S. Cl.
 CPC ............... *G06F 8/65* (2013.01); *G06F 8/658* (2018.02); *G06F 8/70* (2013.01); *G06F 11/36* (2013.01);
 (Continued)

(58) Field of Classification Search
 None
 See application file for complete search history.

(56) References Cited

U.S. PATENT DOCUMENTS

| 9,904,532 B2* | 2/2018 | Cardamore | ............... G06F 8/65 |
| 2007/0050762 A1* | 3/2007 | Chen | ......................... G06F 8/71 |
| | | | 717/169 |

(Continued)

FOREIGN PATENT DOCUMENTS

| JP | 2005-349878 A | 12/2005 |
| JP | 2007-26252 A | 2/2007 |

(Continued)

OTHER PUBLICATIONS

Extended European Search Report issued in counterpart European Application No. 17183669.5 dated Mar. 2, 2018 (nine (9) pages).

(Continued)

*Primary Examiner* — Lewis A Bullock, Jr.
*Assistant Examiner* — Mark A Gooray
(74) *Attorney, Agent, or Firm* — Crowell & Moring LLP

(57) ABSTRACT

Provided is a computer system which, by transmitting software to a terminal for updating a control system of the terminal, enables the terminal to properly function based on the software. A computer system configured so as to be able to remotely update software of a terminal, wherein a processor generates an update file for updating the software of the terminal and stores the generated update file in a memory, identifies a specific terminal to which the update file should be transmitted, reads the update file from the memory and transmits the update file from a transmission module to the specific terminal, receives operational information of the update file from the specific terminal via a reception module, and determines whether it is necessary to distribute the update file to a terminal other than the specific terminal based on the operational information.

9 Claims, 16 Drawing Sheets

(51) Int. Cl.
*G06F 11/36* (2006.01)
*G06F 8/70* (2018.01)
*H04L 29/08* (2006.01)

(52) U.S. Cl.
CPC ...... *G06F 11/3664* (2013.01); *G06F 11/3668* (2013.01); *H04L 67/34* (2013.01); *H04L 69/329* (2013.01)

(56) References Cited

U.S. PATENT DOCUMENTS

| | | |
|---|---|---|
| 2010/0169879 A1 | 7/2010 | Takeda et al. |
| 2012/0030658 A1* | 2/2012 | Hu .................. G06F 11/3688 717/131 |
| 2014/0109075 A1 | 4/2014 | Hoffman et al. |
| 2016/0188318 A1* | 6/2016 | Li .................... H04L 67/34 717/169 |
| 2016/0378449 A1* | 12/2016 | Khazanchi .......... G06F 9/45558 717/120 |
| 2018/0018160 A1 | 1/2018 | Teraoka et al. |

FOREIGN PATENT DOCUMENTS

| | | |
|---|---|---|
| JP | 2007-34826 A | 2/2007 |
| JP | 2010-152749 A | 7/2010 |
| JP | 2014-21586 A | 2/2014 |
| JP | 2014-182571 A | 9/2014 |
| JP | 2016-170740 A | 9/2016 |

OTHER PUBLICATIONS

Japanese-language Office Action issued in Japanese Application No. 2016-194786 dated Feb. 25, 2020 with English translation (10 pages).

* cited by examiner

FIG. 3A

| 100A | 100B | 100C | 100D | 100E | 100F |
|---|---|---|---|---|---|
| UPDATE ID | TARGET VEHICLE MODEL | UPDATE FILE ID | PRE-UPDATE VERSION | POST-UPDATE VERSION | CONTENT |
| UPDATE_002 | MODEL_1 | F20160326_002 | 10.1.2 | 10.1.3 | "IMPROVEMENT OF ABS FUNCTION" |

| 102A | 102B | 102C | 102D |
|---|---|---|---|
| UPDATE FILE ID | SOFTWARE VERSION | UPDATE FILE | UPDATE SCRIPT |
| F20160326_002 | 10_1_3 | 10_1_3.img | 10_1_3.script |

| UPDATE FILE ID | SOFTWARE VERSION | UPDATE FILE | UPDATE SCRIPT |
|---|---|---|---|
| F20160326_001 | 10.1.2 | 10_1_2.img | 10_1_2.script |
| F20160326_002 | 10.1.3 | 10_1_3.img | 10_1_3.script |
| ... | ... | ... | ... |

| VEHI-CLE ID | VEHI-CLE MODEL | ECU_ID | SOFT-WARE VERSION | TEST VEHI-CLE FLAG | LOCATION | VEHI-CLE STATUS | DRIVE DATA |
|---|---|---|---|---|---|---|---|
| CAR_1 | MODEL_2 | ECU_3 | 5.2.0 | 0 | 35°38'5.11"N, 139°52'45.52"E | 1 | Data1 |
| CAR_2 | MODEL_1 | ECU_1, ECU_2 | 10.1.2 | 1 | 35°68'5.18"N, 139°75'28.14"E | 2 | Data2 |
| ... | | ... | ... | ... | ... | ... | ... |

| VEHICLE ID | TEST ITEM | TEST DATE/TIME |
|---|---|---|
| CAR_2 | 1, 2 | 2016/03/30 12:00 2016/04/12 15:00 |
| ... | ... | ... |

| UPDATE FILE ID | SOFTWARE VERSION | UPDATE FILE | UPDATE SCRIPT | TAG INFORMATION |
|---|---|---|---|---|
| F20160326_001 | 10.1.2 | 10_1_2.img | 10_1_2.script | TAG_3 |
| F20160326_002 | 10.1.3 | 10_1_3.img | 10_1_3.script | TAG_2 |
| ... | ... | ... | ... | ... |

COMPUTER SYSTEM, METHOD OF UPDATING SOFTWARE WITH COMPUTER SYSTEM, AND PROGRAM THEREFOR

TECHNICAL FIELD

The present invention relates to a computer system, and in particular relates to a computer system for remotely updating software of a terminal. The present invention additionally relates to a method of updating software with a computer system, and a program therefor.

BACKGROUND ART

In recent years, many products are being controlled with software. And there are systems for updating the software of these products (for instance, Japanese Patent Application Publication No. 2005-349878). As one type of such system, there is an OTA (Over The Air) center, and this system enables, via wireless communication, the remote update of engine control units (ECUs) of vehicles, and control systems of various products and terminals such as smartphones.

CITATION LIST

Patent Literature

[PTL 1] Japanese Patent Application Publication No. 2005-349878

SUMMARY OF THE INVENTION

Problems to be Solved by the Invention

With products comprising a control system, it is important that consideration is given to functional safety. The functional safety standard was formulated at the end of the 1990's mainly by European countries, and, based on "IEC 61508" as the international standard, today independent functional safety standards are being formulated for each product category.

As this type of functional safety standard, there is, for example, "ISO 26262". This functional safety standard applies to hardware/software of electric/electronic equipment related to sensors, control units (ECU), and actuators (motor) among the various systems equipped in automobiles.

"ISO 26262" defines the functional safety across a broad domain (entire lifecycle) from the requirement definition (conceptual phase) to the development, provision, maintenance/operation and vehicle disposal, and automobile manufacturers, automobile parts manufacturers and other suppliers are required to observe this functional safety standard.

The OTA center itself which updates the control software of automobiles needs to be compliant with the functional safety standard as is the case with automobiles. With the "ISO 26262", it is possible to certify that the software and/or hardware component module is compliant with the defined safety requirements based on the "Proven in Use" Section. In other words, if the OTA center has a proven track record of being able to normally distribute system updating software to terminals, then the examining authority of functional safety can divert such track record to the evaluation or screening of the functional safety requirements.

Nevertheless, even if the OTA center is able to apply the updating software to terminals without any problem, if the terminals are unable to function normally based on the software, not only will the OTA center be required to update the software once again, there is a possibility that the evaluation of its track record may also be affected.

Thus, an object of the present invention is to provide a computer system which, by transmitting software to a terminal for updating a control system of the terminal, enables the terminal to properly function based on the software, as well as inventions that are related thereto.

Means to Solve the Problems

In order to achieve the foregoing object, the present invention provides a computer system configured so as to be able to remotely update software of a terminal, comprising: a processor; a memory; a transmission module; and a reception module, wherein the processor: generates an update file for updating the software of the terminal and stores the generated update file in the memory; identifies a specific terminal to which the update file should be transmitted; reads the update file from the memory and transmits the update file from the transmission module to the specific terminal; receives operational information of the update file from the specific terminal via the reception module; and determines whether it is necessary to distribute the update file to a terminal other than the specific terminal based on the operational information. The present invention additionally provides a method of updating software with a computer system, and a program therefor.

Advantageous Effects of the Invention

According to the present invention, it is possible to provide a computer system which, by transmitting software to a terminal for updating a control system of the terminal, enables the terminal to properly function based on the software.

BRIEF DESCRIPTION OF DRAWINGS

FIG. 3A is a table showing an example of update information.

FIG. 3B is a table showing an example of meta information of updating software.

FIG. 5 shows an example of an updating software DB.

FIG. 10A shows a first table of a vehicle database.

FIG. 10B shows a second table of a vehicle database.

DESCRIPTION OF EMBODIMENTS

The computer system according to the present invention is configured so that it can remotely update the software of terminals. One mode of this kind of computer system is an OTA center as described above. Since software which controls the operation and functions of terminals is updated to a new version as needed, the computer system assumes a major part of the processing for updating the software of terminals such as by managing the software for updating the terminals and transmitting the software to the terminals.

As the terminals in which the software is updated by a computer system, there are, for example, engine control units (ECU) of automobiles, but it is not limited thereto, and the terminals may also be, for instance, smartphones, intelligent home appliances, and gas appliances. A terminal may also be referred to as a product or an update-target.

The computer system comprises a plurality of modules which sequentially execute the processing up to transmitting the software, for updating the terminals, to the terminals. A module is a unit for exhibiting the function of the computer system. As the modules, there are hardware modules and software modules (functional modules). A processor of the computer system realizes the functional modules by executing the software. A functional module is all or a part of a program.

If the software does not properly operate in a terminal, the computer system could analyze information, such as an error code, from the terminal, and identify that the software contains a bug. Furthermore, if the computer system is loaded with software for eliminating the bug, the computer system could distribute such software to the terminal. Nevertheless, in cases where the distribution-target of software is an automobile or the like which must be compliant with the functional safety standard, there will be a profound effect if a bug is discovered in the software after the software is broadly distributed. Thus, the computer system actually verifies the operational condition of the software prior to broadly distributing the software to the terminals, and then distributes the software, which underwent advance verification, to the terminals. The computer system explained below is configured to distribute, via wireless communication, the software for updating the control system of ECUs of automobiles to the communication modules of automobiles.

Figure 1:
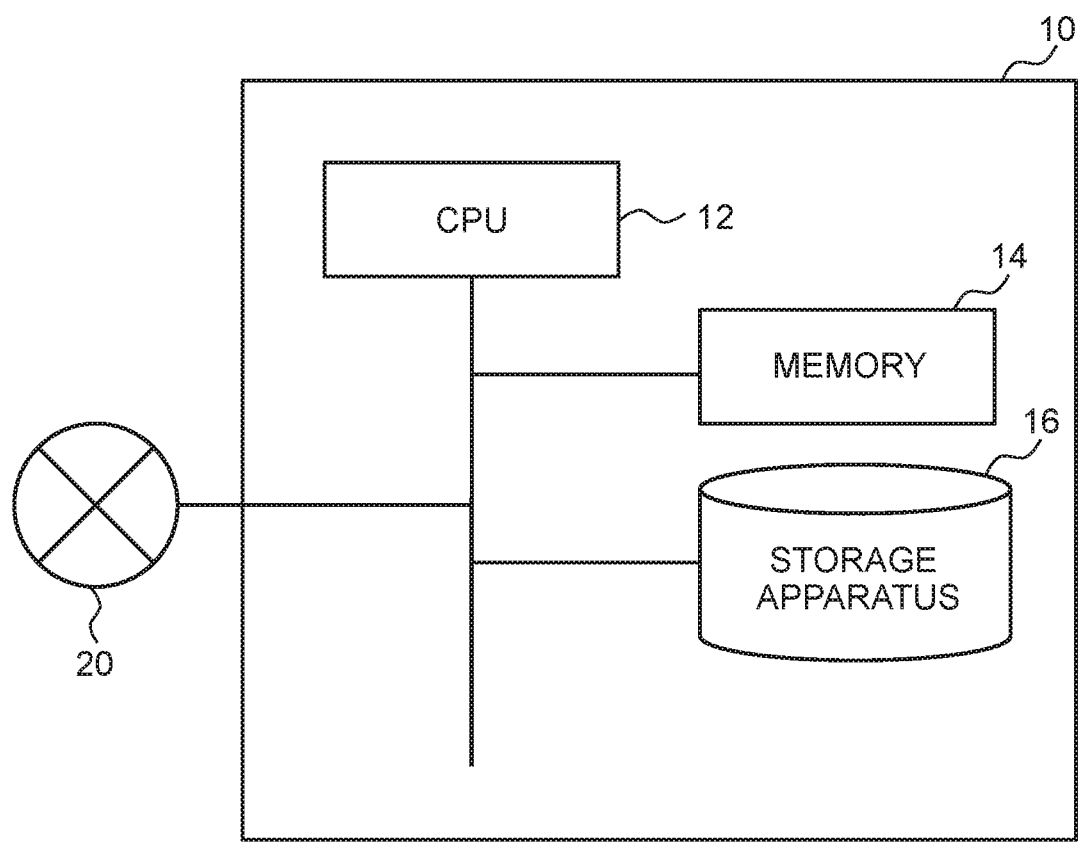
FIG. 1 is a hardware block diagram of a computer system.

FIG. 1 shows a hardware block diagram of a computer system 10. The computer system 10 may also be configured as a server system, and comprises a processor, or a CPU 12 as a controller, a terminal; that is, a memory 14 (non-temporary recording medium) for storing control programs and control data to be used for executing the update processing of software of ECUs as the update-target, and a storage apparatus 16 for storing various data and databases. The storage apparatus 16 may be a hard disk device built into the computer system and/or an external storage device (data center) that can be accessed by the computer system via a network 20. The processor 12 realizes a plurality of modules by executing the control programs, and thereby enables the update of software in the terminals. The computer system 10 is connected with a computer system (server computer, client computer) of the user (vehicle supplier, OEM manufacturer or the like) via the network 20. The computer system may also be referred to as a server system or a data center.

Figure 2:
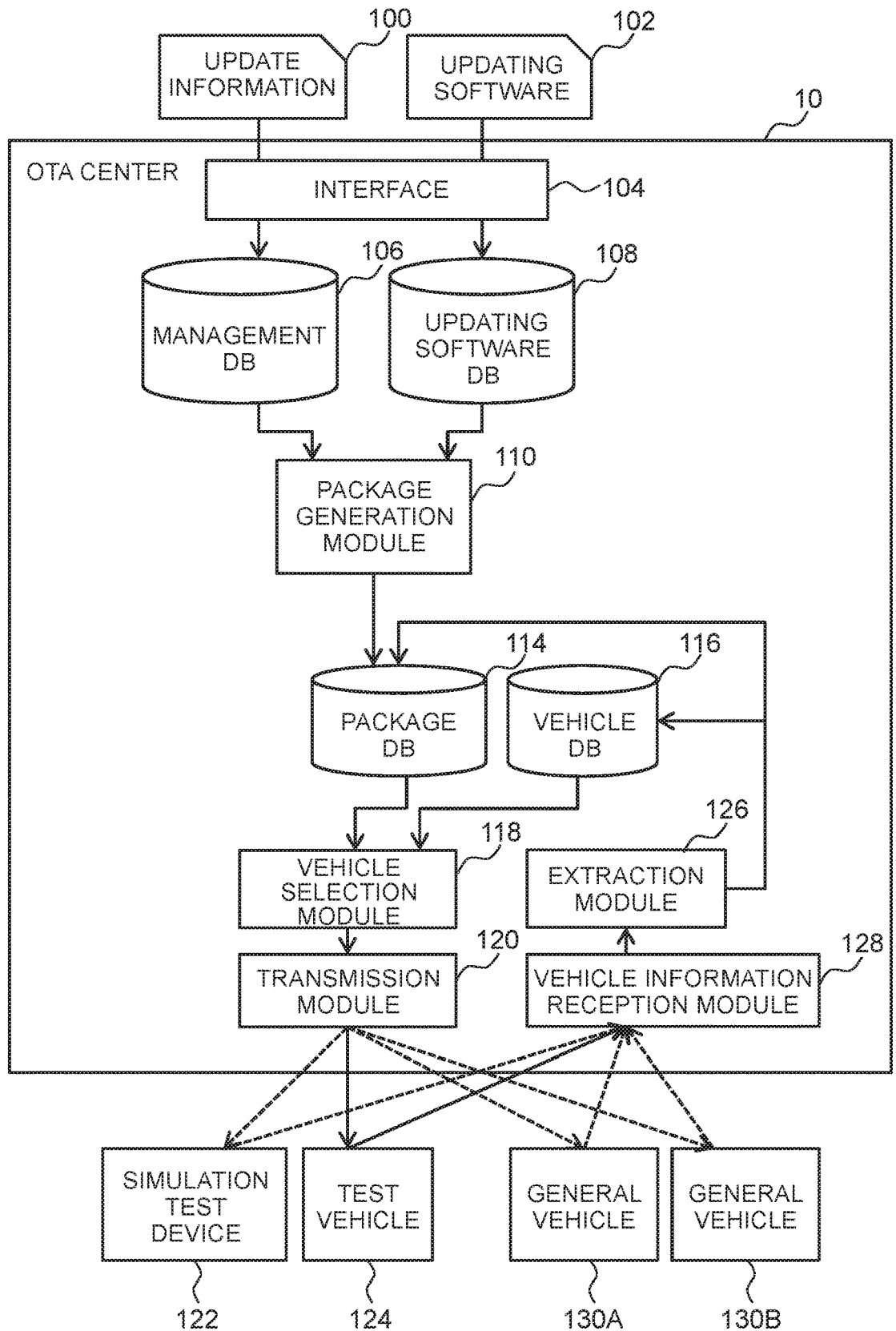
FIG. 2 is a block diagram of a plurality of modules configuring a computer system.

FIG. 2 is a block diagram of a plurality of modules configuring the computer system 10. An interface 104 imports update information 100 and updating software (ECU software) 102 from a computer outside the computer system 10. The update information is provided to the computer system 10, for instance, by an OEM manufacturer. The updating software is provided to the computer system 10, for instance, from a supplier.

The update information 100 is management information for managing the update of software. An example of the update information is depicted in FIG. 3A. The update information 100 includes an update ID (100A), a target vehicle model (100B), an update file ID (100C), pre-update version information (100D), post-update version information (100E), and a content of the updating software: text sentence (100F). The update file is a file of the updating software.

The update ID is identification information for uniquely identifying the task for updating the software. The target vehicle model is information regarding the vehicle model to which the updating software should be applied. The update file ID is information for uniquely identifying the updating software (update file). The pre-update version information is identification information regarding the previous version of the updating software, and the post-update version is identification information regarding the current version of the updating software.

FIG. 3B shows an example of the meta information of the updating software 102. The updating software is configured from an update file and an update script, and the meta information includes an update file ID (102A), version information of the updating software (102B), link information to the storage area of the update file (102C), and link information of the update script (102D).

In FIG. 2, when the interface 104 receives the update information 100, the update information 100 is cumulatively recorded in the management database (DB) 106, and, when the interface 104 receives the updating software 102, the updating software is cumulatively recorded in the updating software DB 108.

Figure 4A:
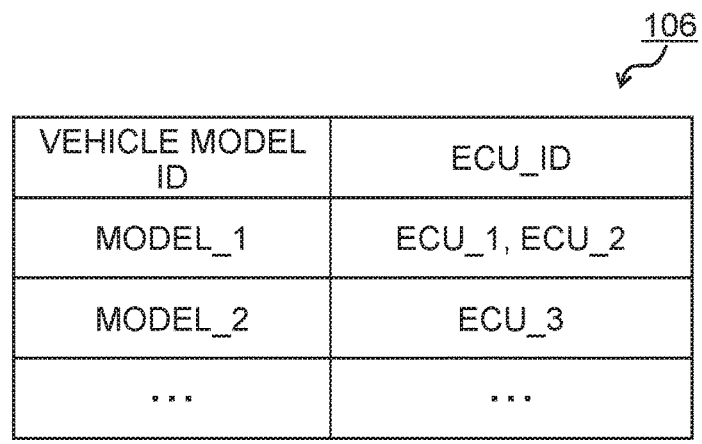
FIG. 4A shows an example of a correspondence table of a vehicle model ID and an ECU ID (engine control unit ID) in a management DB.
Figure 4B:
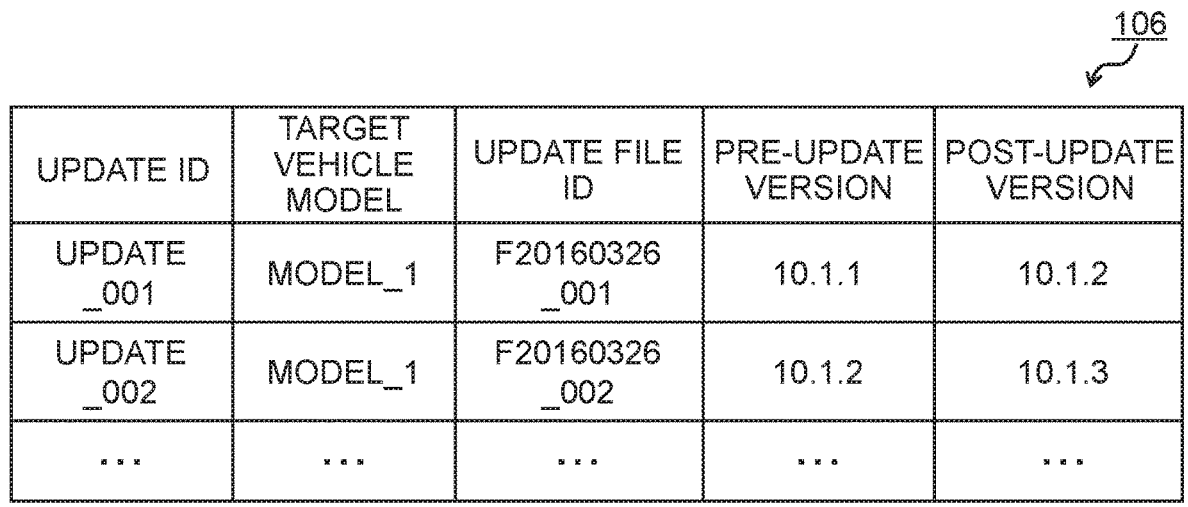
FIG. 4B shows an example of an accumulation table of update information.

FIG. 4A shows an example of a correspondence table of a vehicle model ID and an ECU ID (engine control unit ID) in the management DB 106, and FIG. 4B shows an example of an accumulation table of the update information 100. Furthermore, FIG. 5 shows an example of the updating software DB 108. The DB 108 also stores old versions of the updating software.

Figure 6:
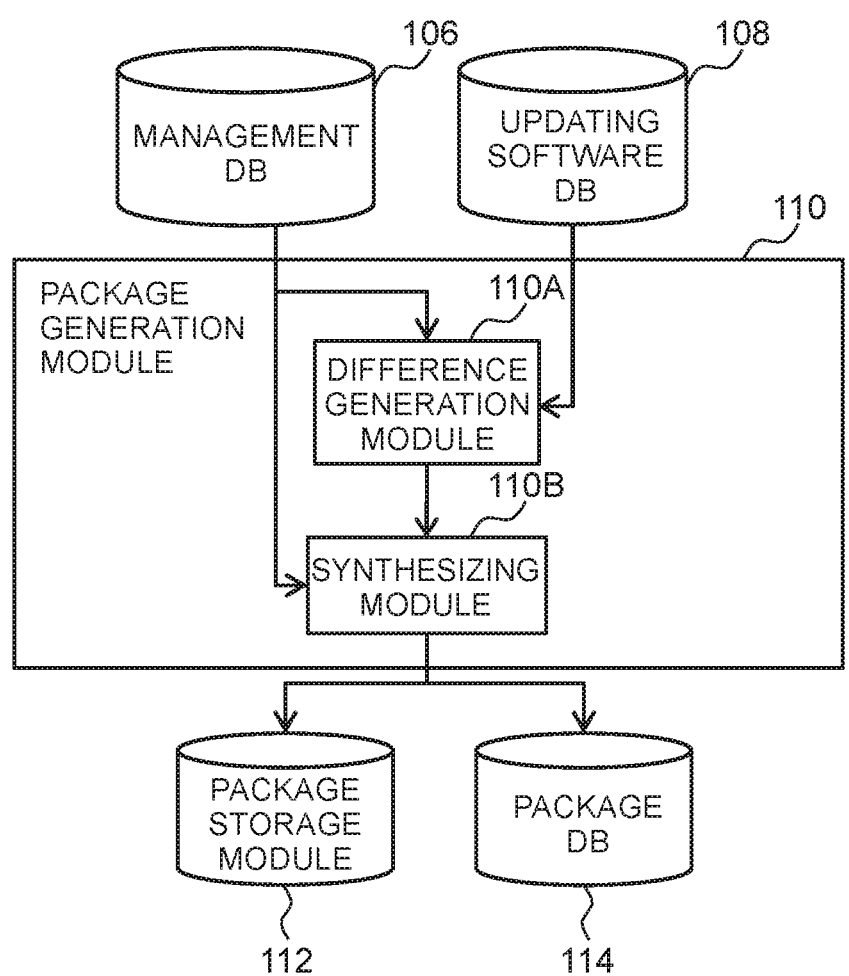
FIG. 6 is a detailed block diagram of a package generation module.

The computer system 10 generates an update file for updating the target based on the updating software. The update file may be generated as a software package comprising a difference file described later. The package generation module 110 (FIG. 2) generates a software package. FIG. 6 is a detailed block diagram of the package generation module. The difference generation module 110A refers to the management database 106 and the updating software DB 108 for each update ID, compares the current version and the previous version of the updating software, obtains a difference of the former relative to the latter, and thereby generates a difference file. The computer system 10 can update the target software from the old version to the new version by applying the difference file to the update-target.

The synthesizing module 110B refers to the management database 106, identifies the target vehicle from the update ID, obtains the ECU ID from the target vehicle model, adds the updated ECU ID to the difference software, and thereby generates a software package to be distributed to the update-target. The synthesizing module 110B records the software package in the package DB 114. The computer system 10 can reduce the data volume to be transmitted by distributing the difference file to the update-target.

Figure 7:
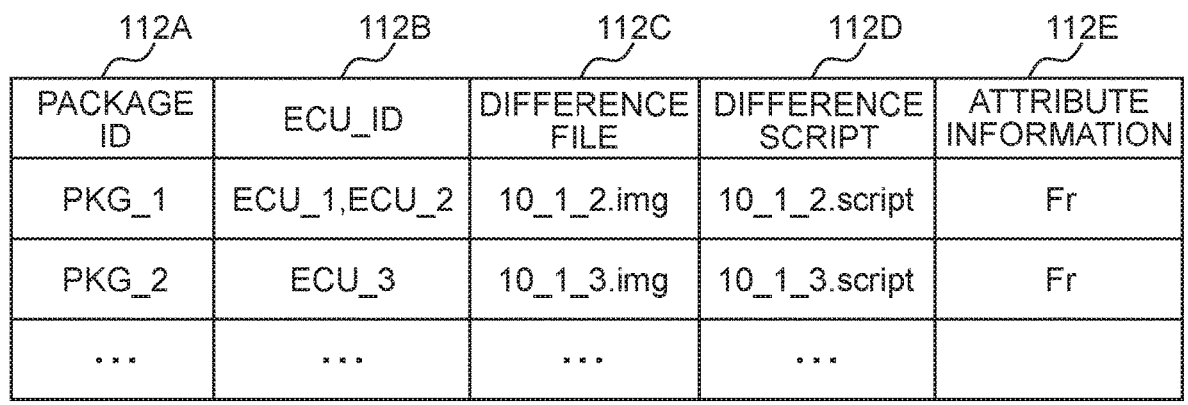
FIG. 7 is a table showing an example of meta information of a software package.

FIG. 7 shows an example of the meta information of the software package (package storage DB 114). The software package includes a package ID for uniquely identifying the package (112A), an ID of the ECU (target ECU) to which the package is to be distributed (112B), link information of the difference file (112C), link information of the difference script (112D), and attribute information 112E. The attribute information is information for managing the update file through the advance verification or distribution of the software package, and is managed based on a flag. The flag will be described in detail later.

The package DB 114 (FIG. 2) associates the software package and the result (verification information) of the advance verification of the update file, and records the association. The term "advance verification" refers to the process of transmitting the updating software to an ECU (specific terminal) of a test vehicle prior to transmitting such updating software to the ECUs (terminals other than the specific terminal; that is, general terminals) of general vehicles, and actually operating the update file in the test vehicle to test whether the updating software will operate normally in the test vehicle. The test vehicle transmits operational information of the update file; that is, verification information as the result of the operation test, and the computer system 10 receives the foregoing information and determines whether the update file passed the operation test Whether the operation test was successful may be determined by the computer system 10, or may be determined by the control system of the test vehicle. The verification information includes a test log (date/time that the test was performed, test result). The test may also be performed regarding a plurality of items. As a result of the test being performed for a plurality of items, the quality of the updating software can be more properly evaluated.

Figure 8:
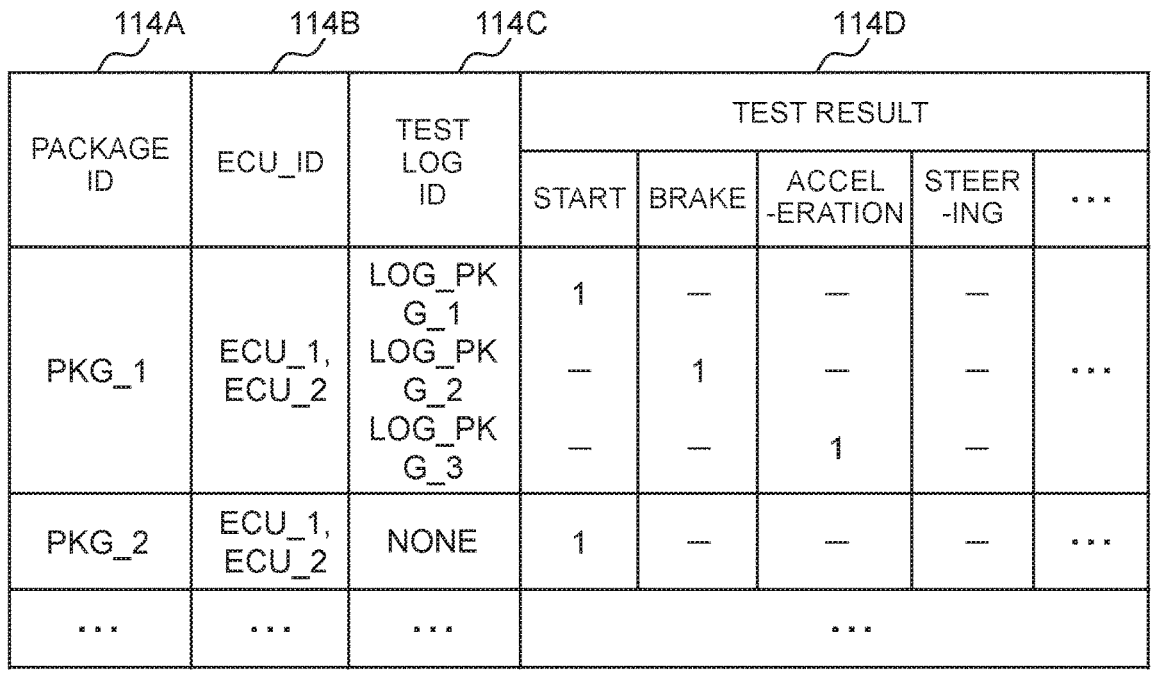
FIG. 8 shows an example of a link table of a software package and a test log recorded in a package DB.

FIG. 8 shows an example of a link table of the software package and the test log recorded in the package DB 114. In this table, the software package ID (114A) is associated with the target ECU ID (114B) and the test log ID 114C. The computer system (test result extraction module 126 described later) identifies the test log ID and generates a test log information table (FIG. 9) each time it receives information of the test result from the test vehicle, and determines the test result (114D) and records it in the link table (FIG. 8). The terms "start", "brake", "acceleration", and "steering" in FIG. 8 are examples of test items. "1" indicates that the updating software operated normally in the test vehicle, and "-" indicates that the test was not performed. Note that, when the updating software did not operate normally in the test vehicle, "0" is recorded in the link table. Note that the test log could be used as evidence in the foregoing "Proven in Use" Section.

Figure 9:
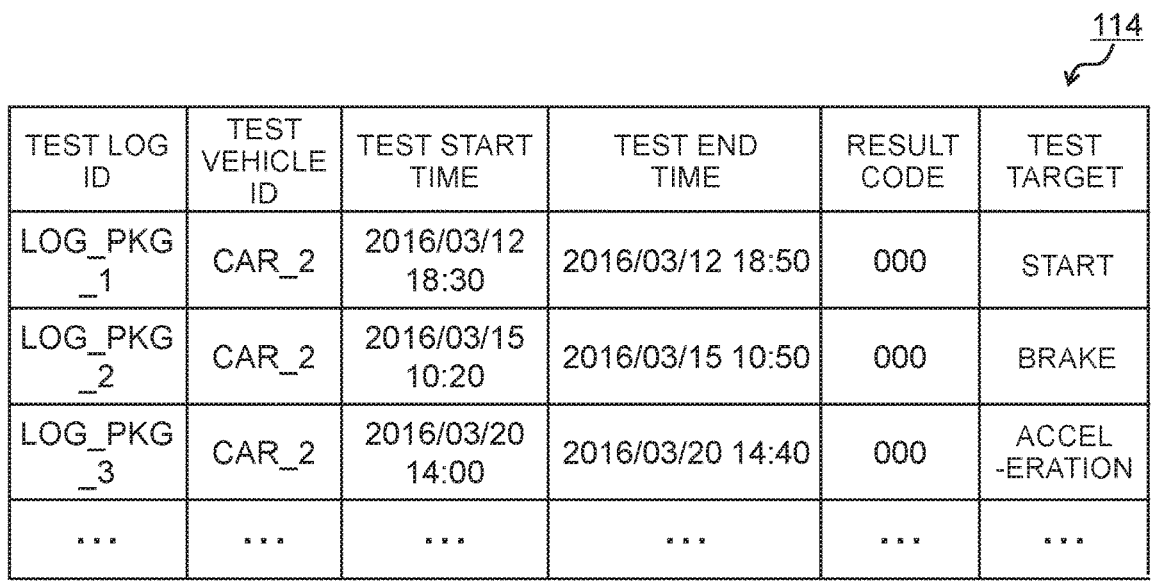
FIG. 9 shows an example of a test log information table.

FIG. 9 shows an example of the test log information table. This table may also be recorded in the package data DB 114. This table includes, for each test log ID, an ID of the test vehicle that was tested, a test start date/time, a test end date/time, a result code, and a test target. The computer system 10 determines the test result from the result code, "000" indicates that the software operated normally.

The computer system 10 additionally comprises a vehicle DB 116 (FIG. 2) which records information regarding the update-target (vehicle). Next, the vehicle DB 116 is an information table of vehicles, and FIG. 10A shows a first table as an example thereof. This table includes, for each vehicle ID, a vehicle model, an ECU ID, version of software for operating the ECU, a test vehicle flag (1: test vehicle, 0: general vehicle), vehicle location information, a vehicle status flag (1: undergoing maintenance, 2: testable, 3: currently being tested), and drive data.

The drive data includes the drive modes of the vehicle such as "braking frequency" and "highway usage frequency". The computer system 10 (for example, the module 126) sets the vehicle ID, the vehicle model, the ECU ID, and the test vehicle flag upon registering the vehicle in the vehicle database 116. The computer system 10 rewrites the version of the software each time it updates the software of the vehicle. The computer system 10 updates the location information and the drive data of the vehicle based on the information received from the vehicle. While the location information and the drive data are not essential for general vehicles, the foregoing information is effective upon selecting a test vehicle suitable for the software operation test among a plurality of test vehicles.

FIG. 10B shows a second table of the vehicle database 116, and stores, for each test vehicle ID, a test item, a date/time that the test was performed, or a date/time (schedule) that the test is to be performed. The test items are managed based on flags (1: start test, 2: drive test, 3: fault injection test). A test vehicle is a vehicle that is suitable for verifying the updating software (software package); for example, a vehicle comprising a system (sensor or the like) for detecting the operation of the software. A test vehicle may also be separately prepared for each test item.

Figure 11:
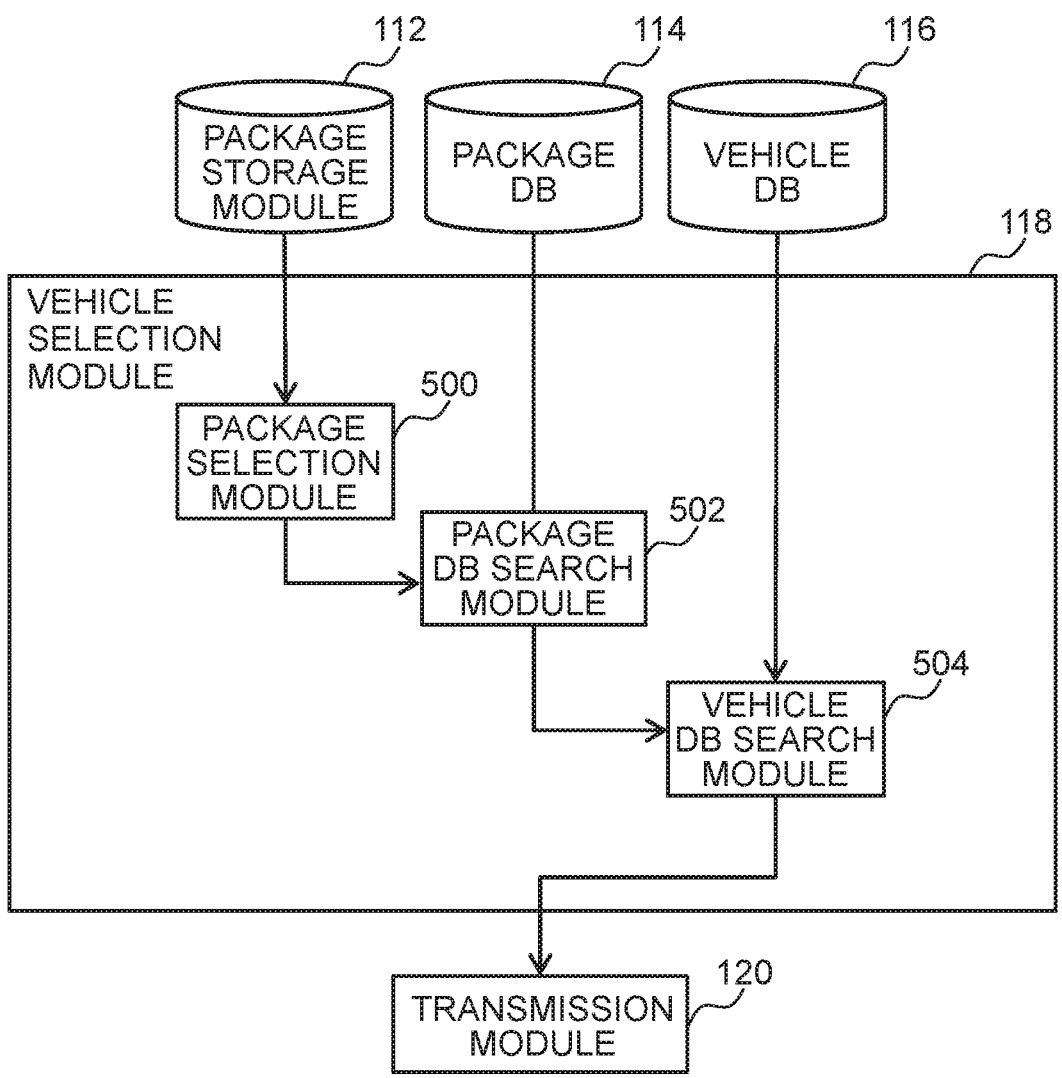
FIG. 11 is a detailed block diagram of a vehicle selection module.

The computer system 10 selects the vehicle to which the software package should be applied based on the vehicle selection module 118 (FIG. 2). FIG. 11 is a detailed diagram of this module. A package selection module 500 selects the software package based on the package DB 114. The package DB search module 502 determines whether it is necessary to transmit the software package based on the ID of the selected software package, and the vehicle DB search module 504 searches the vehicle DB 166 based on the determination result to the effect that the transmission of the software package is required, selects the vehicle to which the software package should be transmitted, and transmits the result to the transmission module 120. The transmission module 120 transmits the software package to the selected vehicle. As the vehicles, there are general vehicles 130A, 130B and a test vehicle 124 as described above. The test vehicle may also be a simulation test device 122 which enables the operation test of software without having to actual be driven on the road; for instance, a device in the form of a driving simulator.

The vehicle information reception module 128 (FIG. 2) receives the information from the vehicle to which the software package was transmitted. The received information includes the result of the software operation test sent from the simulation test device or the test vehicle. Otherwise, the received information may also include information on whether it was possible to normally install the software package in the ECU.

The extraction module 126 extracts the result of the software operation test from the information that was received by the vehicle information reception module 128, and records the extracted result in the package DB 114 and the vehicle DB 116.

The computer system 10 determines whether the software package may be broadly distributed to general vehicles, whether advance verification should be performed prior to the distribution, and whether a bug was discovered in the operation of the software as a result of the advance verification and repair work (debugging or the like) is required, and implements processing in accordance with the determination result. The computer system 10 makes the foregoing determination based on the attributes of the software package (update file).

Attributes of the software package are information related to the advance verification of the update file, and include flag Fr1: whether or not an advance verification test has been performed (Fr1=0: advance verification test not yet performed, Fr1=1: advance verification test performed), flag Fr2: advance verification test result (Fr2=0: test failed, Fr2=1: test passed), flag Fr3: whether distribution to general vehicles is required (Fr3=0: distribution not required, Fr3=1: distribution required), flag Fr4: whether the software package has been distributed to general vehicles (Fr4=0: not yet distributed, Fr4=1: distributed), flag Fr5: whether distribution to a test vehicle is required (Fr5=0: distribution not required, Fr5=1: distribution required), and flag Fr6: whether the software package has been distributed to a test vehicle (Fr6=0: not yet distributed, Fr6=1: distributed). The default status is set as follows: Fr1←0, Fr2←Null, Fr3←0, Fr4←0, Fr5←0, Fr6←0.

Figure 12:
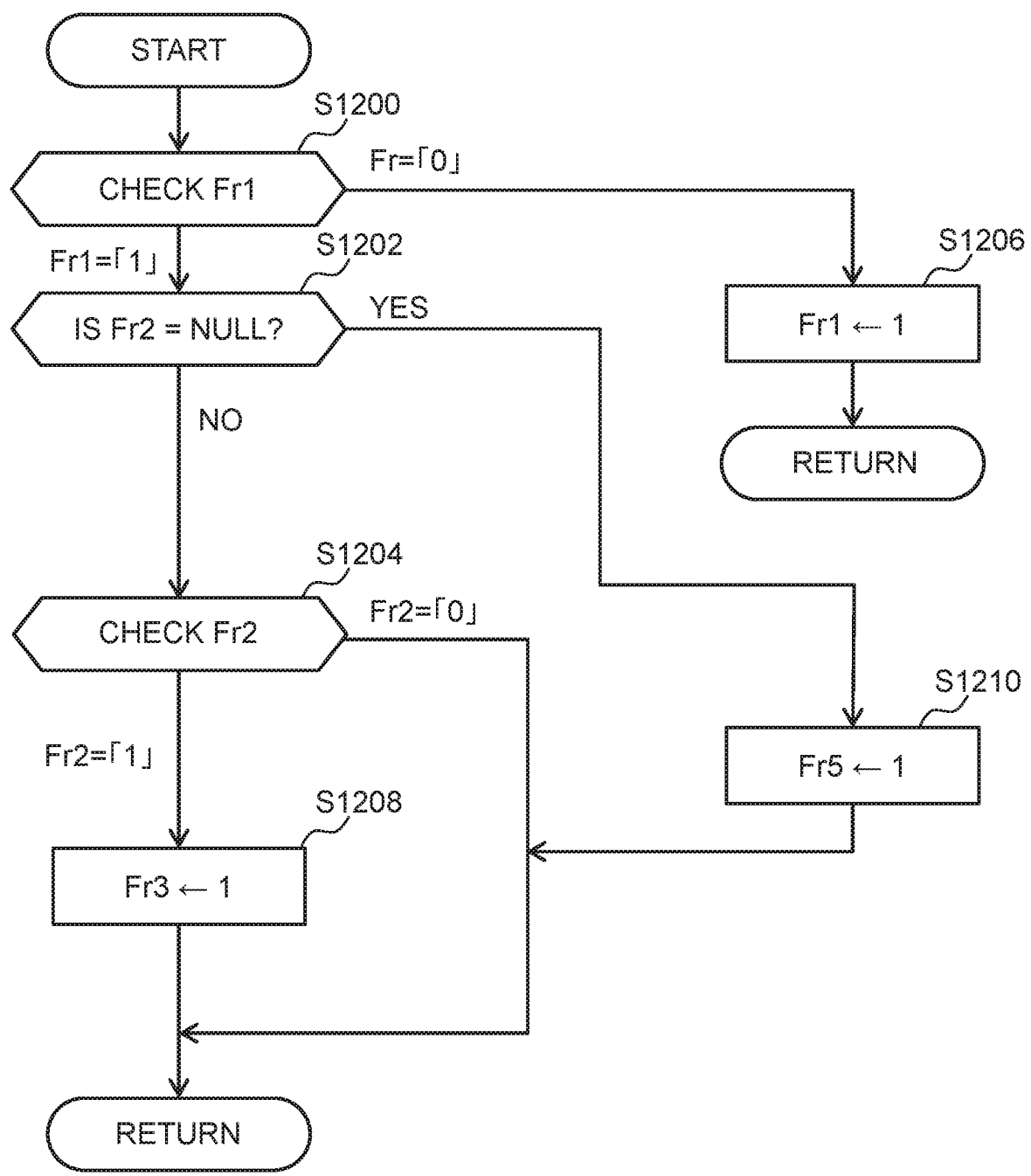
FIG. 12 is a flowchart or setting an attribute flag in a software package.

The computer system 10 (for example, the package generation module 110) periodically refers to the package DB 114, and sequentially processes a plurality of software packages as follows according to the package ID. FIG. 12 shows a flowchart for setting the attribute flags in the software package. The package generation module 110 checks the flag Fr1 of the processing target package ID (S1200). When the flag Fr1="0". The package generation module 110 sets Fr1 to "1" (S1206), and then returns.

When the flag Fr1="1", the package generation module 110 determines whether the flag Fr2 is Null (S1202), and, upon obtaining a positive result, sets the flag Fr5 to "1" on grounds that it is necessary to perform the advance verification of the updating software in the test vehicle prior to distributing the software package to the general vehicles (S1210).

When the package generation module 110 obtains a negative result in step 1202, the package generation module 110 checks the flag Fr2 (S1204), and, upon determining Fr2="1", sets the flag Fr3 to "1" in order to permit the distribution of the software package to the general vehicles on grounds that the updating software operated normally in the ECU of the vehicle as a result of the advance verification of the updating software (S1208), and then returns. In S1204, when the package generation module 110 determines that the flag Fr2="0", the package generation module 110 returns without performing this step.

Figure 13:
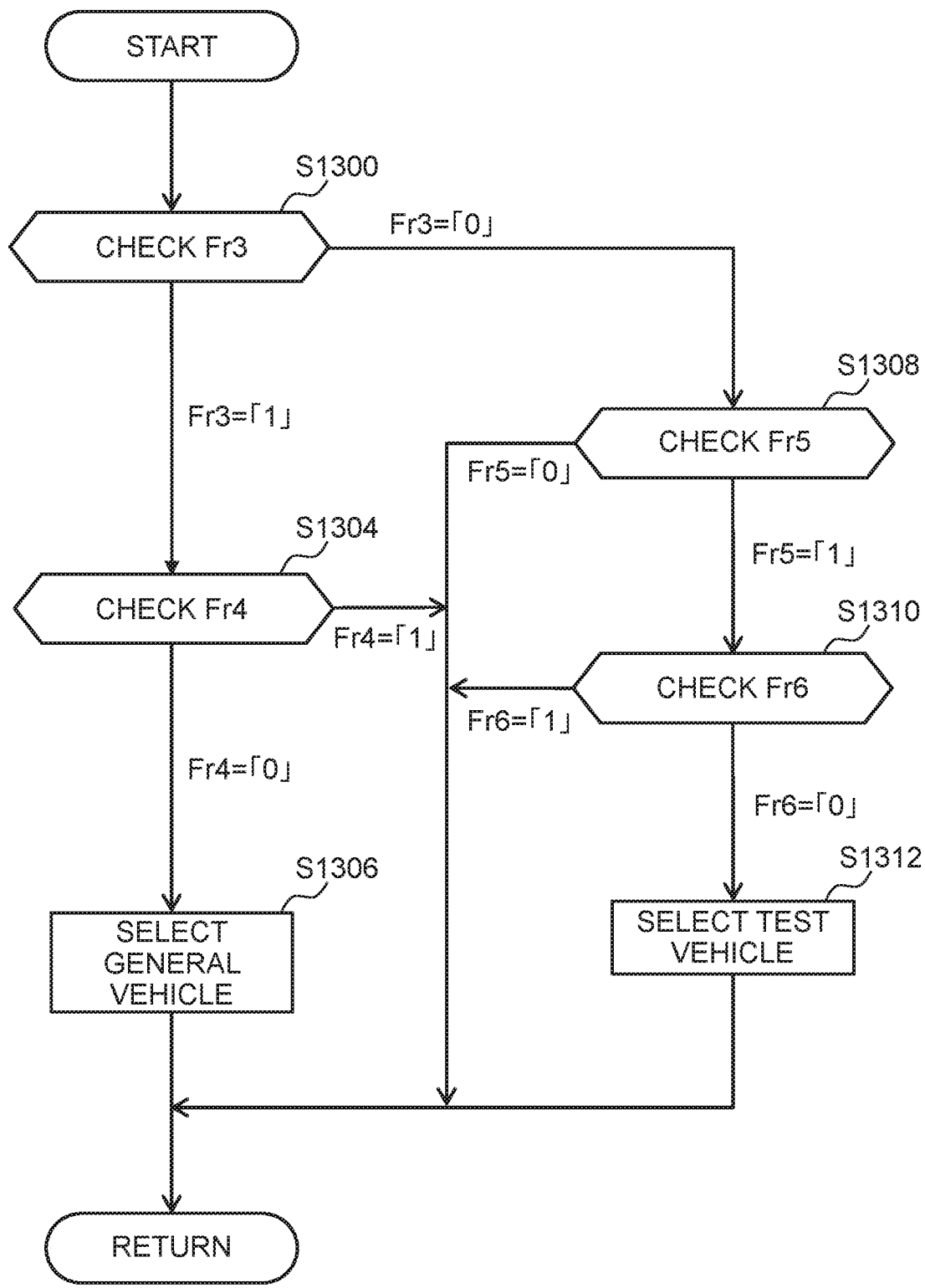
FIG. 13 is a flowchart showing an operation of a vehicle selection module.

FIG. 13 is a flowchart showing the operation of the vehicle selection module 118. The vehicle selection module 118 checks the flag Fr3 (S1300), and then checks the flag Fr4 (S1304), and, upon determining that Fr3="1", Fr4="0", refers to the software package DB based on the ECU ID of the processing target package ID and identifies the corresponding vehicle model, and selects the general vehicles that are registered as the same vehicle model (S1306).

When the vehicle selection module 118 determines that Fr3="0" in S1300, the vehicle selection module 118 proceeds to S1308 and checks the flag Fr5 (S1308). When the vehicle selection module 118 determines that Fr5="1", the vehicle selection module 118 proceeds to S1310 and checks the flag Fr6.

When the vehicle selection module 118 determines that Fr6="0", the vehicle selection module 118 refers to the DB 114 based on the ECU ID corresponding to the processing target package ID and identifies the corresponding vehicle model, and selects a test vehicle that is registered as the same vehicle model (S1312). When there are a plurality of corresponding test vehicles, the vehicle selection module 118 selects a test vehicle that is suitable for the test. As one reference for selection, for instance, there is the location of the vehicle. When a speed test is to be performed regarding the software, it would be preferable to select a vehicle that is close to a test course or the highway, and, when a normal drive test is to be performed, it would be sufficient to select a vehicle on a general public road. The drive data in the package DB 114 may also be used as a reference upon selecting the test vehicle. A different test vehicle may also be selected for each test item.

When the vehicle selection module 118 determines that Fr4="1" (S1304), Fr5="0" (S1308), and Fr6="1" (S1310), the vehicle selection module 118 returns without selecting a vehicle. The vehicle selection module 118 transmits information of the selected vehicle to the transmission module 120.

Figure 14:
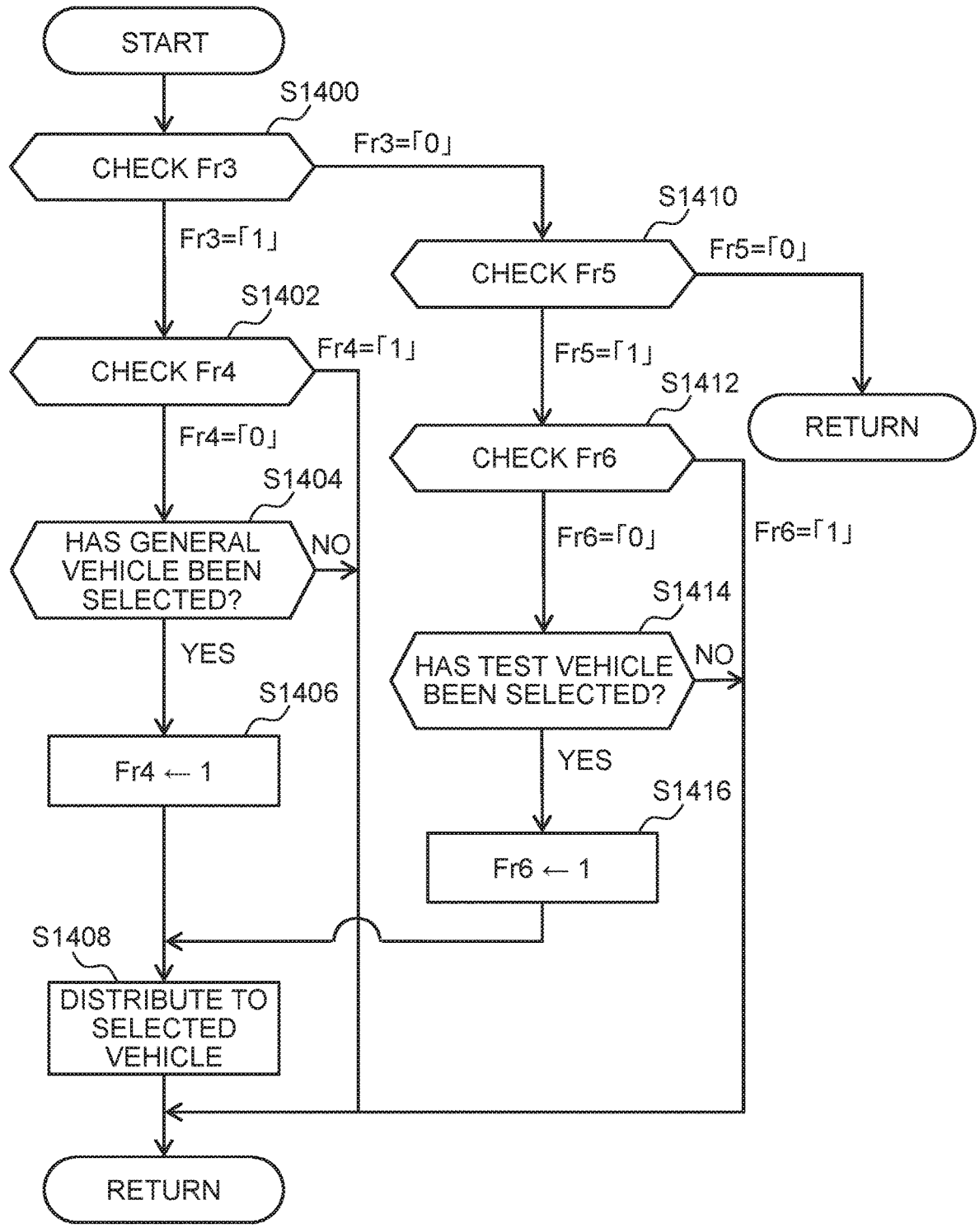
FIG. 14 is a flowchart showing an operation of a transmission module.

FIG. 14 is a flowchart showing the operation of the transmission module 120. The transmission module 120 checks the flag Fr3 of the processing target package ID (S1400), and then checks the flag Fr4 (S1402). When the transmission module 120 determines that Fr3="0", and Fr4="0", the transmission module 120 determines whether general vehicles have been selected (S1404), and, upon obtaining a positive result, sets the flag Fr4 to "1" (S1406), distributes the software package to the general vehicles (S1408), and then returns. When the transmission module 120 determines that Fr4=1 in S1404 and obtains a negative result in S1404, the transmission module 120 returns without distributing the software package to the general vehicles.

When the transmission module 120 determines that Fr3=0 in S1400, the transmission module 120 proceeds to S1410 and checks the flag Fr5, proceeds to S1412 upon determining that Fr5="1", and returns upon determining that Fr5="0", In S1412, when the transmission module 120 checks Fr6 and determines that Fr6="0", the transmission module 120 determines whether a test vehicle has been selected (S1414), and, upon obtaining a positive result, sets Fr6 to "1" (S1416), transmits the software package to the test vehicle (1408), and then returns. When the transmission module 120 determines that Fr6=1 in step S1412, or obtains a negative result in S1414, the transmission module 120 returns without proceeding to S1408.

Figure 15:
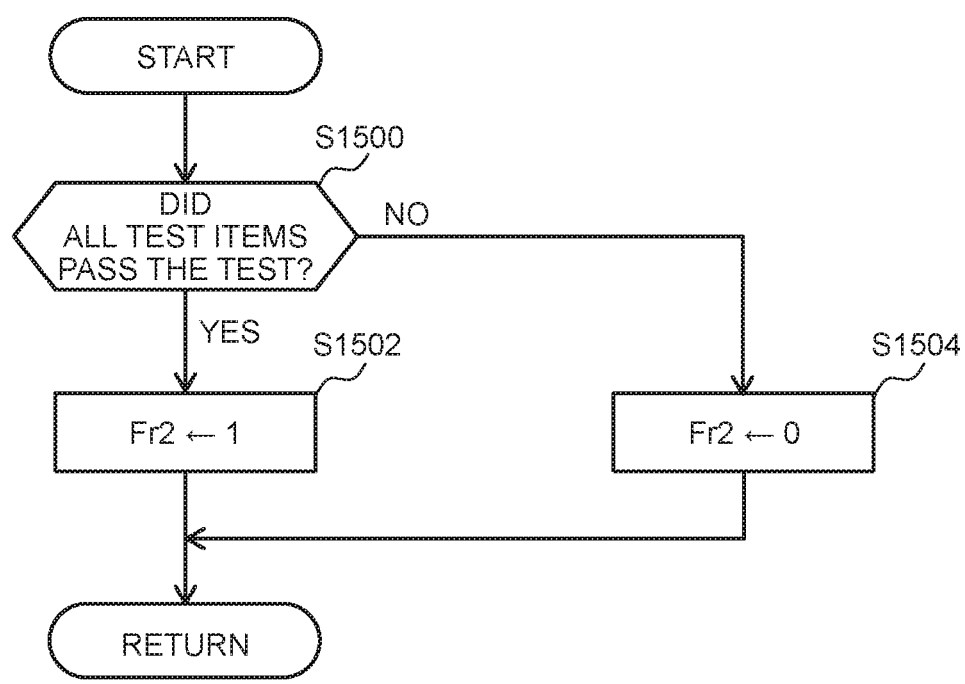
FIG. 15 is a flowchart showing an operation of an extraction module.

FIG. 15 is a flowchart showing the operation of the extraction module 126. When the extraction module 126 refers to the package DB 114 and determines that all test items have passed the test of the update file (S1500: YES), the extraction module 126 sets Fr2 to "1" in the processing target package ID (S1502), and, upon obtaining a negative result in S1500, sets Fr2 to "0" (S1504), and then returns. When the computer system 10 confirms Fr2="0" in the processing target package ID, the computer system 10 can take measures such as repair processing (debugging or the like) for the software of the processing target package ID. Note that the extraction module 126 may also set Fr2 to "1" in the processing target package ID upon referring to the package DB 114 and determining that key items among all test items have passed the test of the update file.

According to the foregoing computer system, it is possible to prevent the updating software from being distributed to numerous terminals, before undergoing advance verification, by a plurality of modules referring to flags. Accordingly, when it is possible to apply the software to the terminals, it is possible to guarantee that the terminals will function properly based on the software. Furthermore, according to the foregoing computer system, the software can be updated by coordinating with users such as suppliers and OEM manufacturers.

Figure 16:
FIG. 16 shows an example of a meta information table of updating software according to a second embodiment.

The second embodiment of the present invention is now explained. This embodiment differs from the foregoing embodiment with regard to the following point. The computer system 10 can identify and manage the system update-target by adding or associating traceability information to or with the foregoing updating software. As the traceability information, there is, for example, a software ID tag (this is hereinafter referred to as the "tag"). FIG. 16 shows a table of meta information of the updating software. A tag is assigned to the updating software in substitute for the target vehicle model. The computer system can classify the application to targets of updating software based on tags.

Figure 17:
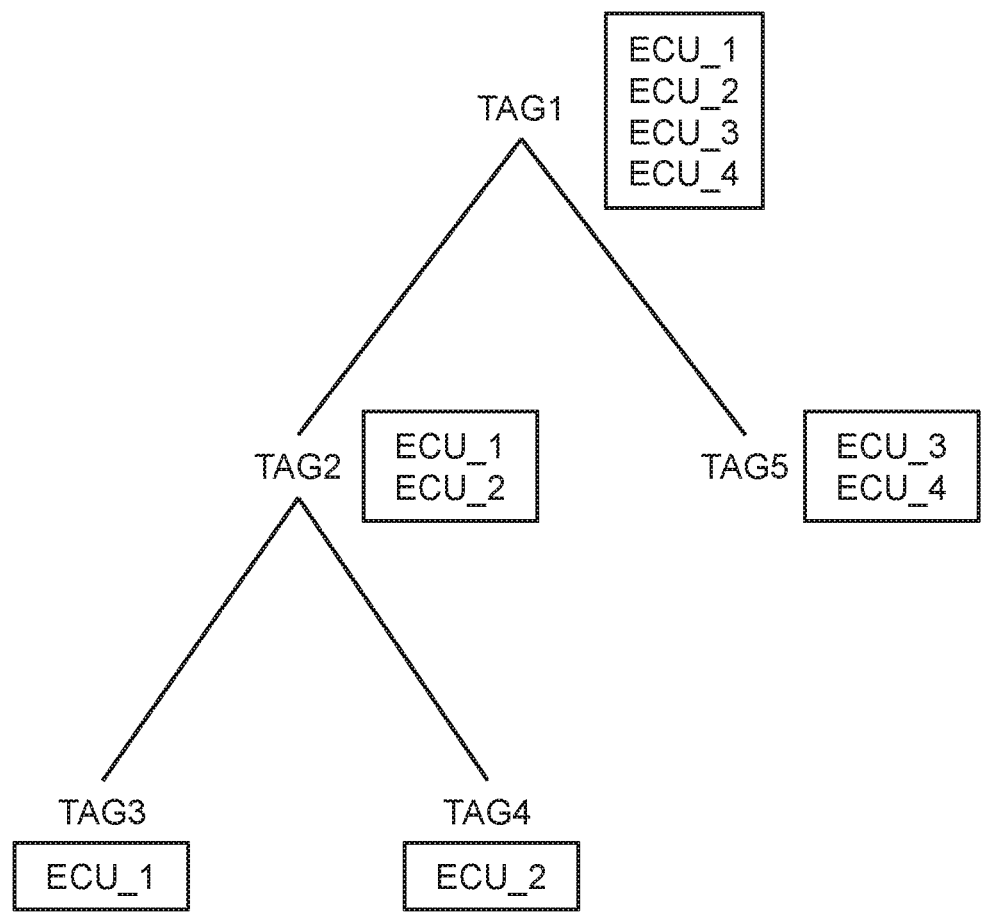
FIG. 17 shows an example of a tree structure obtaining by hierarchizing a plurality of tags.

A plurality of tags may be hierarchized, for instance, as shown in FIG. 17. According to FIG. 17, TAG 1 is an upper tag of TAG 2 and TAG 5, and TAG 2 is an upper tag of TAG 3 and TAG 4. TAG 1 relates to ECU 1, ECU 2, ECU 3, and ECU 4, TAG 2 relates to ECU 1, and ECU 2, TAG 3 relates to ECU 1, TAG 4 relates to ECU 2, and TAG 5 relates to ECU 3, and ECU 4. By associating the TAGs and the update-targets as described above, the computer system can efficiently update the software.

For example, if the update file to which TAG 1 is assigned is applied to the vehicle, because TAG 1 is the uppermost tag, update based on the software to which TAG 2 to TAG 5 are assigned is not necessarily required. Similarly, because TAG 2 is an upper tag of TAG 3 and TAG 4, if the targets are updated with the software to which TAG 2 is assigned, update based on TAG 3 and TAG 4 is not necessarily required. The hierarchized structure of the TAGs and the correspondence of the TAGs and the update-targets may be set in the memory 14 of the computer system in the form of a management table. This management table may be set in the computer system by the supplier. The package generation module 110 merely needs to identify the update-target from the TAG based on the management table, and add it to the software package.

The explanation of the foregoing embodiments must not be understood as limiting the present invention in any way. The foregoing embodiments may be modified as needed. For example, the computer system may also set a distribution prohibition flag in the update file which did not operate normally in the test vehicle, and prohibit the distribution of the update file to the general vehicles until the update file is corrected and the prohibition flag is cancelled. The computer system may also delete, from the memory, the update file which did not operate normally in the test vehicle. The computer system may also set a test "not-required" flag in the update file in which advance verification is not required, and promptly distribute the update file to the general vehicles upon confirming such test "not-required" flag.

INDUSTRIAL APPLICABILITY

The present invention can be used in a center for updating software of terminals.

REFERENCE SIGNS LIST

10 Computer system
12 Processor
14 Memory
16 Storage apparatus
20 Network

The invention claimed is:

1. A computer system configured so as to be able to remotely update software, comprising:
a processor;
a memory;
a transmission module; and
a reception module, wherein the processor:
receives updating software from an external computer;
generates an update file for updating the software based on the updating software and stores the generated update file in the memory, wherein the update file includes metadata having: a package ID, an electronic control unit (ECU) identifier of a target ECU to which the update file is to be distributed and attribute information represented as a flag for managing the update file through an advance verification or distribution of the update file;
based on an advanced verification flag, determines whether an advance verification process of the updating software is necessary prior to general distribution;
based on needing the advance verification process, selecting a test vehicle capable of undergoing an operation test of the update file using a vehicle information table, wherein the vehicle information table includes at least a vehicle identifier, a vehicle model, an ECU identifier, a test vehicle flag, vehicle location information, and drive data, and wherein selection of the test vehicle is based on the metadata matching a vehicle in the vehicle information table having the test vehicle flag set and, when a plurality of test vehicles are eligible, further selecting the test vehicle based on the location information and the drive data of the test vehicles;
reads the update file from the memory and transmits the update file from the transmission module to the test vehicle to perform updating on the test vehicle;
receives operational test information of the update file from the test vehicle via the reception module;
determines whether it is necessary to distribute the update file to a second terminal based on the operational test information by confirming that the update file operated normally in the test vehicle based on the operational test information; and
based on a determination to distribute, distributes the update file to the second terminal.

2. The computer system according to claim 1, wherein the processor:
generates, as the update file, a difference of a new version of the updating software relative to an old version of the updating software.

3. The computer system according to claim 2,
wherein the memory includes an information table of the second terminal, and
wherein the processor refers to the information table, and selects the test vehicle among a plurality of terminals capable of undergoing the operation test.

4. The computer system according to claim 1,
wherein the processor:
receives from the test vehicle, as the operational test information, a result of the operation test of the update file.

5. The computer system according to claim 4, wherein the processor: associates the update file with a log of the operation test, and stores the associated update file in the memory.

6. The computer system according to claim 4, wherein the processor:
receives from the test vehicle, as the operational test information, a result of the operation test of each of a plurality of items of the update file.

7. The computer system according to claim 1,
wherein the second terminal is a control system of a vehicle,
wherein the test vehicle is a control system capable of undergoing the operation test of the update file, and
wherein the second terminal is a control system of each of a plurality of general vehicles to which the update file is distributed.

8. A method of updating software with a computer system configured so as to be able to remotely update software,
wherein the computer system:
receives updating software from an external computer;
generates and stores an update file for updating the software based on the updating software, wherein the update file includes metadata having: a package ID, an electronic control unit (ECU) identifier of a target ECU to which the update file is to be distributed and attribute information represented as a flag for managing the update file through an advance verification or distribution of the update file;
based on an advanced verification flag, determines whether an advance verification process of the updating software is necessary prior to general distribution;
based on needing the advance verification process, selecting a test vehicle capable of undergoing an operation test of the update file using a vehicle information table, wherein the vehicle information table includes at least a vehicle identifier, a vehicle model, an ECU identifier, a test vehicle flag, vehicle location information, and drive data, and wherein selection of the test vehicle is based on the metadata matching a vehicle in the vehicle information table having the test vehicle flag set and, when a plurality of test vehicles are eligible, further selecting the test vehicle based on the location information and the drive data of the test vehicles;
reads the update file and transmits the update file to the test vehicle to perform updating on the test vehicle;
receives operational test information of the update file from the test vehicle;
determines whether it is necessary to distribute the update file to a second terminal based on the operational test information by confirming that the update file operated normally in the test vehicle based on the operational test information; and
based on a determination to distribute, distributes the update file to the second terminal.

9. A non-transitory computer readable storage medium having stored thereon a computer program containing computer readable instructions, which, when executed by a computer including a processor, causes the processor to perform a method of remotely updating software, wherein the method comprising:
receives updating software from an external computer;
generating and storing an update file for updating the software based on the updating software, wherein the update file includes metadata having: a package ID, an electronic control unit (ECU) identifier of a target ECU to which the update file is to be distributed and attribute information represented as a flag for managing the update file through an advance verification or distribution of the update file;
based on an advanced verification flag, determines whether an advance verification process of the updating software is necessary prior to general distribution;
based on needing the advance verification process, selecting a test vehicle capable of undergoing an operation test of the update file using a vehicle information table, wherein the vehicle information table includes at least a vehicle identifier, a vehicle model, an ECU identifier, a test vehicle flag, vehicle location information, and drive data, and wherein selection of the test vehicle is based on the metadata matching a vehicle in the vehicle information table having the test vehicle flag set and, when a plurality of test vehicles are eligible, further selecting the test vehicle is selected based on the location information and the drive data of the test vehicles;
reading the update file and transmitting the update file to the test vehicle to perform updating on the test vehicle;
receiving operational test information of the update file from the test vehicle;
determining whether it is necessary to distribute the update file to a second terminal based on the operational test information by confirming that the update file operated normally in the test vehicle based on the operational test information; and
based on a determination to distribute, distributing the update file to the second terminal.

* * * * *